United States Patent Office 3,162,452
Patented Dec. 22, 1964

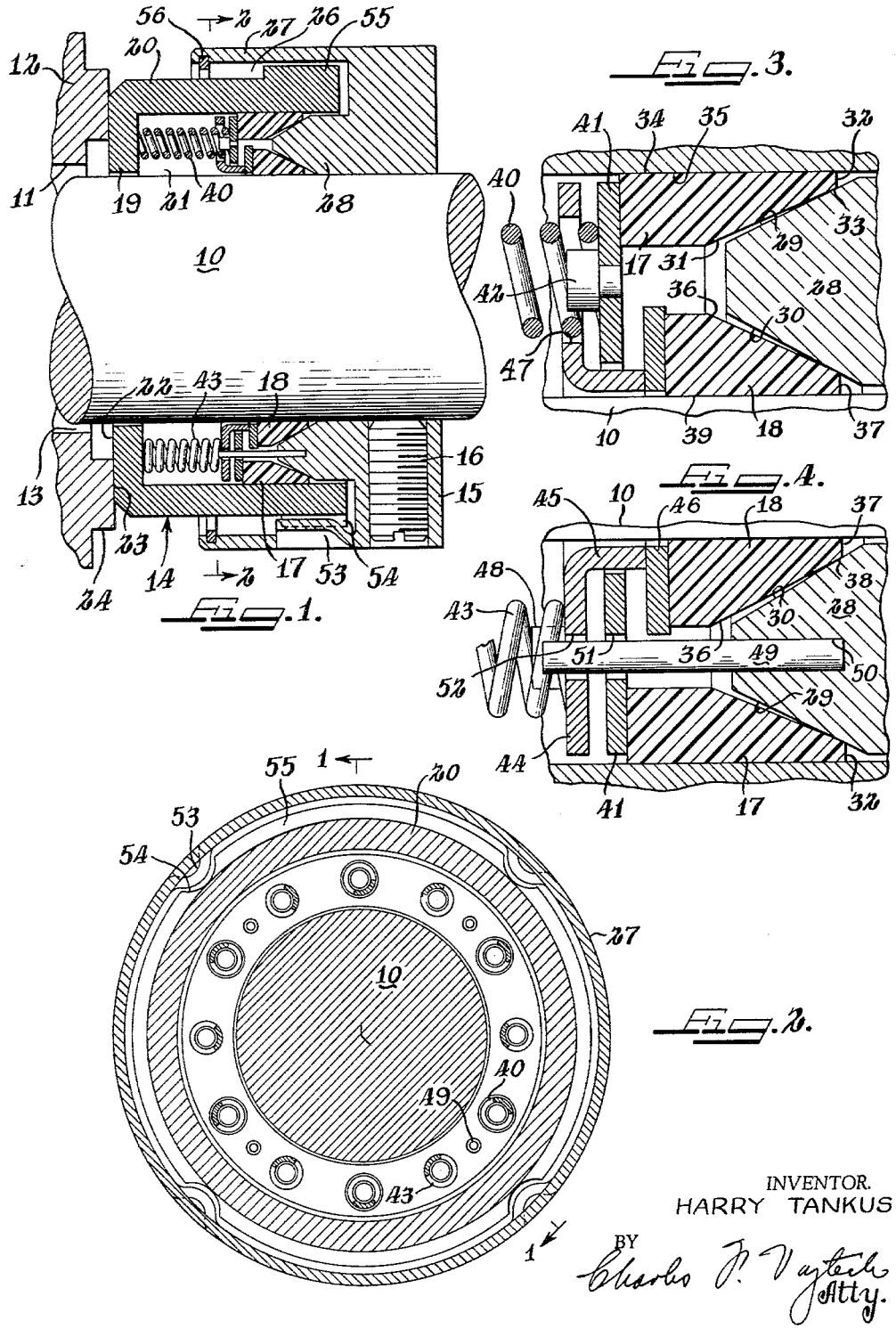

3,162,452
HYDRAULICALLY BALANCED ROTARY MECHANICAL SEAL WITH DOUBLE SEALING WEDGES
Harry Tankus, Wilmette, Ill., assignor to Crane Packing Company, Morton Grove, Ill., a corporation of Illinois
Filed Dec. 3, 1962, Ser. No. 241,842
9 Claims. (Cl. 277—86)

This invention relates to rotary end face seals with secondary packing. It is particularly well adapted for use with secondary packing made from polytetrafluoroethylene sold under the trademark "Teflon."

A desirable characteristic of polytetrafluoroethylene is its ability to withstand temperatures up to 500° F., whereas other materials commonly used for similar purposes are limited to 250° F. and in some rare instances to 300° F. Another desirable characteristic is its ability to withstand the chemical action of highly corrosive fluids. This material has some undesirable characteristics, however, which impose limitations on its use in the field of flexible sealing elements for rotary mechanical seals. Thus it can be bent and flexed to a limited degree, but it cannot be expanded in the manner of a rubber band, for example. This inability to expand limits the shapes into which it can be molded to those enabling it to be lifted out of a mold and eliminates shapes requiring expansion around reentrant corners.

One of the packing forms into which polytetrafluoroethylene can be molded without difficulty is that of an endless packing ring having the shape in radial cross section of a V lying on its side, the V form resulting in a groove in one side of the packing ring, and the ends of the V being tapered to form relatively flexible sealing lips. A metal expander ring is wedged into the groove to urge the lips apart and into sealing engagement with concentric cylindrical surfaces on two machine elements which are to be sealed with respect to one another. It has been found, however, that this material is not completely stable, and that after undergoing repeated pressure and temperature cycles it will change dimensionally to the point where one of the lips no longer contacts its cylindrical surface and a leak then develops.

As an example of the dimensional changes which polytetrafluoroethylene undergoes under cyclically varying conditions, an end face rotary mechanical seal containing a V-type packing ring of this material was subjected to pressures increasing from zero to 200 p.s.i. in 50 p.s.i. increments, and to ambient temperatures which rose above 250° F. When the test was repeated within the next 24 hours, excessive leakage developed as the pressure was raised to only 100 p.s.i. An examination of the V-ring showed that the outside diameter of the V-ring was 0.021" undersized, whereas it had been of the correct dimension when installed.

The forces acting upon a secondary packing in a rotary mechanical seal depend upon whether the seal is an "inside" seal or an "outside" seal. An "inside" seal is one which is disposed in the pump chamber, or in a seal chamber in the pump housing which is in direct hydraulic communication with the pump chamber. An "outside" seal is one which is disposed outside the pump chamber and faces in a direction which is opposite to that of the "inside" seal. An "inside" seal cannot readily be balanced except by introducing a step of some sort in the shaft, either directly, or by a sleeve rigidly secured to the shaft. An outside seal, however, can be very readily balanced without the use of a step in the shaft and, in addition, can be more readily observed and serviced. For this reason an outside seal is frequently preferred over an inside seal.

It has been proposed to use as the secondary packing member of a rotary mechanical seal a ring made of polytetrafluoroethylene and having a wedge shape in radial cross section. Such wedge-shaped ring has been very successful as an "inside" seal, but it cannot be used as a balanced "outside" seal because of structural limitations. If made like an "inside" seal, but placed outside the pump chamber and turned to face the pump chamber, fluid pressure from the pump chamber acts to loosen the ring rather than to wedge it into sealing position.

It is an object of this invention to provide a seal of the rotary type in which a polytetrafluoroethylene secondary seal is used, wherein provision is made for reducing the effects of the dimensional instability of this material upon its ability to function as intended.

As a more specific object, this invention seeks to provide a secondary seal of polytetrafluoroethylene in which the secondary seal is in the form of two radially spaced concentric wedge rings, each physically independent of the other so that shrinkage of one ring has no effect upon the other.

Another specific object of this invention is to provide a secondary seal of polytetrafluoroethylene in which two radially spaced concentric wedge rings are used, and in which two sets of springs serve to provide wedging pressure for the wedges, said springs being mounted on the same pitch circle to keep the radial dimension of the seal to a minimum.

These and other objects of this invention will become apparent from the following detailed description when taken together with the accompanying drawings in which FIG. 1 is a side elevational view in section of a seal embodying this invention, the view being taken along line 1—1 of FIG. 2 and in the direction of the arrows at the ends thereof;

FIG. 2 is an end elevational view in section of the seal, the view being taken along line 2—2 of FIG. 1 and looking in the direction of the arrows at the ends thereof of FIG. 1; and FIGS. 3 and 4 are enlarged views in longitudinal section of the secondary seals of FIG. 1.

In the drawing there is shown a shaft 10 which passes through an opening 11 in a housing 12 within which is contained a pump or other device for moving liquid under pressure (not shown). The pump chamber is located generally to the left of the portion of the housing 12. Opening 11 is larger than the diameter of shaft 10, thus creating a space 13 through which the liquid under pressure in housing 12 may pass.

The escape of fluid through space 13 is prevented by a rotary mechanical seal comprising a primary sealing element 14, a seal retainer 15 affixed to shaft 10 by a set screw 16, a secondary sealing element 17 adapted to effect a seal between primary sealing element 14 and retainer 15 and a secondary seal 18 adapted to effect a seal between seal retainer 15 and shaft 10.

Primary sealing element 14, in accordance with this invention, takes the form of a cup-shaped annulus surrounding shaft 10 and having a radially extending part 19 and a cylindrical part 20 spaced from shaft 10 to form an annular chamber 21 therebetween. The exterior radial surface 22 on part 19 is finished in a manner to provide a perfectly flat and smooth surface. Said surface 22 is adapted to abut upon a similarly smooth and flat surface 23 formed on an annular axially extending rib 24 on housing 12. If desired, said rib 24 may be formed on a separate ring which is mounted on a flexible annulus in sealing engagement with the housing itself (not shown).

It is contemplated that relative rotation produced between primary sealing element 14 and annular rib 24 will merely cause surfaces 22 and 23 to bear frictionally against one another and because of the smoothness and flatness of the said surfaces, a running fluid tight seal will nonetheless be effected.

Seal retainer 15 is preferably a ring fitting closely around shaft 10. A recess 26 is formed in the lefthand end of retainer 15 as seen in FIG. 1, leaving a relatively thin cylindrical shell or housing 27 around the exterior of the retainer. Adjacent to shaft 10, recess 26 is formed with an axially extending flange 28, the radially outer and inner corners of which are tapered as at 29 and 30 (FIGS. 3 and 4).

Secondary sealing element 17 is comprised of a ring of polytetrafluoroethylene or a material having similar physical and chemical characteristics. Said ring 17 is generally rectangular in radial cross section except that the corner thereof adjacent tapered surface 29 is formed with a tapered surface 31, the angle of which may be such as to cause surface 31 to diverge slightly from surface 29 so as to provide, in effect, a lip 32 having line contact at 33 with surface 29. Outer surface 34 may be cylindrical and made to contact the inner cylindrical surface 35 of the cylindrical part 20 of primary sealing element 14. Similarly, secondary sealing element 17 is a ring of polytetrafluoroethylene or material having similar physical and chemical properties, and is generally rectangular in radial cross section except that it is provided with a tapered surface 36 adjacent to surface 30, the angle of surface 36 with respect to surface 30 being such as to cause surface 36 to diverge slightly therefrom and to form a lip 37, having line contact at 38 with surface 30. The inner surface 39 of ring 18 is substantially cylindrical and fits snugly over shaft 10.

It is contemplated that rings 17 and 18 will be urged axially to the right as viewed in FIGS. 1, 3 and 4 to cause a wedging action between each of the secondary sealing elements 17, and 18 and flange 28 on one hand, and cylindrical part 20 and shaft 10, respectively, on the other hand. A predetermined minimum pressure will be provided by springs acting in compression between radially extending part 19 on the primary sealing element 14, and the secondary sealing elements 17 and 18. Additional axial pressure will be provided by fluid under pressure finding its way through space 13, along shaft 10 into annular chamber 21. Said fluid pressure will also act against radially extending part 19 on primary sealing element 14 to urge said element against surface 23. It is contemplated that the inner diameter of surface 23 will be less than the inner diameter of cylindrical part 20, i.e., less than the diameter of surface 35 on said part 20 so that there will be a net effective pressure upon radially extending part 19 to urge said part against surface 23.

As shown more clearly in FIGURE 3, the minimum axial pressure upon secondary sealing element 17 is provided by a series of springs 40 compressed between radially extending part 19 and a washer 41 bearing against secondary sealing element 17. Said washer 41 may be provided with buttons 42, which serve to center and locate springs 42 relative to washer 41.

It may be noted that rings 17 and 18 are of unequal axial extent, ring 17 being longer than ring 18 so that washer 41 contacts only ring 17. Ring 18 is urged to the right as viewed in FIGURE 4 with a minimum pressure provided by a series of springs 43 compressed between radially extending part 19 and a washer 44 of special configuration.

Washer 44 has an axially extending flange 45, the end of which abuts upon a washer 46 overlying the end of secondary sealing element 18 and transmits pressure from washer 44 to said secondary seal 18 through said washer 46. The inner diameter of washer 41 is sufficiently large to allow flange 45 to pass through the space formed between washer 41 and shaft 10 to contact washer 46. Washer 44 is also formed with openings 47 through which springs 40 may pass to contact washer 41. Washer 44 may be similarly provided with buttons 48 which serve to locate springs 43 with reference to washer 44.

The desired alignment between springs 43 and washer 44 is furnished by a plurality of pins 49 pressfitted into suitable recesses 50 in flange 28 of seal retainer 15 and extending axially between secondary seals 17 and 18 through openings 51 and 52 in washers 41 and 44, respectively.

The relative disposition of springs 40 and 43 and pins 49 in chamber 21 is shown in FIG. 2. In this figure are also shown the lugs 53 by which the primary seal ring 14 is constrained to rotate with seal retainer 15 but is permitted to move axially relative thereto to take up for wear of surfaces 22 and 23. Said lugs are comprised of axially disposed indentations in shell 27, which extend into corresponding recesses 54 formed in the outer surface of a short flange 55 extending radially outwardly from cylindrical part 20.

It may be noted that pins 49, in addition to locating washers 41 and 44 relative to one another, serve also to hold washer 46 prior to assembly of the seal on shaft 10. The entire seal may be held in assembled relation prior to installation on a shaft by a snapring 56 located near the left-hand edge of shell 27 as viewed in FIGURE 1.

The fluid to be sealed passes through opening 11, past radially extending part 19 into chamber 21 and presses in opposite directions upon flange 19 on the one hand and secondary seals 17 and 18 on the other. When the apparatus driven by shaft 10 is inoperative and the fluid in chamber 21 as a consequence is not under pressure, sealing pressure upon secondary seals 17 and 18 and upon primary sealing element 14 is furnished by springs 40 and 43. The total fluid pressure acting upon flange 19 in chamber 21 may be made to exceed by a small amount the total fluid pressure acting upon said flange within annular rib 24 and thus reduce the total pressure exerted by the fluid upon flange 19 in the direction of rib 24.

Since secondary seals 17 and 18 are independent rings, dimensional changes in either ring resulting from temperature changes will not affect the other ring. For example, should inner ring 18 contract as a result of a reduction in temperature, it will not pull ring 17 radially inwardly with it to cause ring 17 to separate from shell 27 and cause a leak. There is no large mass of polytetrafluoroethylene such as is present in a single V-ring to render control of lips 32 and 37 difficult. Each ring 17 and 18 is relatively thin in radial cross section and can be readily distorted at its lip into contact with the surfaces adjacent thereto.

It is understood that the foregoing description is merely illustrative of a preferred embodiment of this invention and that the scope of this invention is not to be limited thereto but is to be defined by the appended claims.

I claim:

1. A rotary mechanical sealing device for effecting a fluid-tight seal between relatively rotatable machine elements, said device comprising a seal seat mounted on one of said elements, a primary sealing element having a running sealing fit with the said seal seat, an abutment on the other of said machine elements, and secondary seal means for effecting a fluid-tight seal between the primary sealing element and the said other of said machine elements, said secondary seal means comprising a first wedge ring for effecting a seal between the abutment and said other of said machine elements a second wedge ring for effecting a seal between the abutment and the primary sealing element, resilient means compressed between the primary sealing element and the first wedge ring and other resilient means compressed between the primary sealing element and the second wedge ring, all of said resilient means being disposed on the same circle.

2. A rotary mechanical sealing device as described in claim 1, said abutment comprising a ring secured to said other of said elements, said primary sealing element having an annular opening thereinto facing said ring, an axially extending annular nose portion on said ring extending into the annular opening in the washer, said nose portion being tapered to define wedge-shaped openings between said nose portion and said other of said elements and between said nose portion and said primary sealing element, and said wedge rings being inserted in the wedge-shaped openings.

3. A rotary mechanical sealing device as described in claim 1, all of said resilient means comprising helical springs, the helical springs of the first-mentioned resilient means being alternately positioned with the helical springs of the said other resilient means on said circle.

4. A rotary mechanical sealing device as described in claim 1, one of said resilient means comprising helical springs, washer means interposed between the other of said resilient means and the wedge ring compressed thereby, said washer having openings therein through which the said helical springs pass to compress the other of said wedge rings.

5. A rotary mechanical sealing device for effecting a fluid-tight seal between relatively rotatable machine elements, one of which elements passes through the other, said device comprising a primary sealing element having a radially disposed external sealing surface and a cylindrical part extending axially therefrom and forming a chamber with the said one machine element, an abutment adapted to be fixed to the said one element, a pair of secondary sealing rings within the chamber and encircling said one machine element, said rings having wedge-shaped radial cross-sections so constructed that said rings are adapted upon being urged axially against the abutment to form fluid-tight seals therewith and with the cylindrical part and with the said one element, respectively, and means exerting axial pressure upon the primary sealing element in one direction and upon the said secondary sealing rings in the opposite direction to urge said elements to form said seals with said abutment.

6. A rotary mechanical seal as described in claim 5, said means exerting axial pressure comprising first and second resilient means, means for transmitting axial pressure from the first resilient means to one of said sealing rings, and means for transmitting axial pressure from the second resilient means to the other of said sealing rings.

7. A rotary mechanical seal as described in claim 5, one of said sealing rings being longer in an axial direction than the other, rigid washers interposed between the means exerting axial pressure upon the sealing rings and said sealing rings, one of said rigid washers having openings therein through which the means exerting axial pressure on the other of said rigid washers may extend, said other of said rigid washers having an opening, and means on said one rigid washer extending through the opening in the said other of said rigid washers and transmitting said axial pressure to the shorter of said rings.

8. A rotary mechanical seal as described in claim 7, and means for preventing relative rotation between said abutment and said rigid washers.

9. A rotary mechanical seal as described in claim 7, and further comprising axially disposed pins on the abutment, said rigid washers having aligned openings through which said pins extend whereby to prevent relative rotation between the abutment and the rigid washers.

References Cited in the file of this patent
UNITED STATES PATENTS

| | | |
|---|---|---|
| 2,419,588 | Pasco | Apr. 29, 1947 |
| 2,963,306 | Tracey | Dec. 6, 1960 |